US012811917B2

(12) United States Patent
Jones

(10) Patent No.: US 12,811,917 B2
(45) Date of Patent: Nov. 24, 2026

(54) SYSTEMS AND METHODS FOR PACKET SPREADING DATA TRANSMISSION WITH ANONYMIZED ENDPOINTS

(71) Applicant: Michael T. Jones, Monterey, CA (US)

(72) Inventor: Michael T. Jones, Monterey, CA (US)

(*) Notice: Subject to any disclaimer, the term of this patent is extended or adjusted under 35 U.S.C. 154(b) by 31 days.

(21) Appl. No.: 19/006,031

(22) Filed: Dec. 30, 2024

(65) Prior Publication Data

US 2025/0141849 A1 May 1, 2025

Related U.S. Application Data

(63) Continuation of application No. 18/392,125, filed on Dec. 21, 2023, now Pat. No. 12,224,990, which is a continuation of application No. 18/115,334, filed on Feb. 28, 2023, now abandoned, which is a continuation of application No. 17/341,321, filed on Jun. 7, 2021, now abandoned, which is a continuation of application No. 16/039,243, filed on Jul. 18, 2018, now Pat. No. 11,082,408.

(60) Provisional application No. 62/535,206, filed on Jul. 20, 2017.

(51) Int. Cl.
*H04L 9/40* (2022.01)

(52) U.S. Cl.
CPC ...... *H04L 63/0421* (2013.01); *H04L 63/0471* (2013.01); *H04L 63/18* (2013.01)

(58) Field of Classification Search
CPC .. H04L 63/0421; H04L 63/0471; H04L 63/18
See application file for complete search history.

(56) References Cited

U.S. PATENT DOCUMENTS

| | | | |
|---|---|---|---|
| 7,330,968 B2 | 2/2008 | Kimura | |
| 7,590,245 B1 | 9/2009 | Levitan | |
| 7,664,875 B1 | 2/2010 | Clay et al. | |
| 8,516,131 B2 * | 8/2013 | Larson | H04L 45/00 709/227 |
| 8,719,336 B2 | 5/2014 | Douceur | |
| 8,885,826 B2 | 11/2014 | Nakamura | |

(Continued)

FOREIGN PATENT DOCUMENTS

WO WO2017/056398 4/2017

OTHER PUBLICATIONS

Phan et al., "Multi-Channel Broadcast Encryption", May 2013, Proceedings of the 8th ACM SIGSAC symposium on Information, pp. 277-286 (Year: 2013).*

(Continued)

*Primary Examiner* — Kenneth W Chang

(74) *Attorney, Agent, or Firm* — IP Strategy Consulting

(57) ABSTRACT

A packet-spreading data transmission system with anonymized endpoints facilitates enhanced fortified private communications between a plurality of arbitrary devices via a plurality of communication channels or networks. The data transmission system receives at a source endpoint device a message of arbitrary length. The message includes a destination address associated with a destination endpoint device. Both source endpoint device and the destination endpoint device are selected from a plurality of arbitrary devices. The received message are fragmented and agilely transmitted, via a plurality of communication channels, from the source endpoint device to the destination endpoint device.

16 Claims, 6 Drawing Sheets

(56) References Cited

U.S. PATENT DOCUMENTS 9,635,148 B2 4/2017 Tewari
9,686,062 B2 6/2017 Purohit
10,038,715 B1 7/2018 Majkowski
10,313,486 B2 6/2019 Zhao
10,356,054 B2 7/2019 Dolev
10,749,808 B1 8/2020 MacCarthaigh
10,791,052 B2 9/2020 Ignatchenko
10,791,132 B1 9/2020 Power
11,082,408 B2 8/2021 Jones
12,224,990 B2 2/2025 Jones
2002/0015422 A1 2/2002 Inada
2002/0066015 A1* 5/2002 Iwamoto ........... H04L 12/40104 713/168
2002/0138850 A1* 9/2002 Basil ................ H04N 21/42676 725/111
2002/0159410 A1* 10/2002 Odenwalder ......... H04L 1/1829 370/465
2002/0164024 A1 11/2002 Arakawa
2003/0115364 A1 6/2003 Shu et al.
2003/0229681 A1* 12/2003 Levitan .............. H04N 21/4622 709/218
2004/0103205 A1 5/2004 Larson
2005/0097433 A1* 5/2005 D'Arcy ............... H03M 13/096 714/807
2005/0111376 A1* 5/2005 Raghothaman ....... H04L 1/0071 370/465
2006/0029102 A1 2/2006 Abe
2007/0217424 A1 9/2007 Kim
2007/0255947 A1 11/2007 Choudhury
2008/0162922 A1 7/2008 Swartz
2009/0228700 A1 9/2009 Hubbell
2009/0249059 A1 10/2009 Asano
2011/0173442 A1* 7/2011 Troxel .................... H04L 63/18 713/160
2012/0110103 A1 5/2012 Larson
2013/0201316 A1 8/2013 Binder
2014/0029523 A1* 1/2014 Sterman .............. H04L 63/0428 370/352
2014/0119380 A1 5/2014 Bakhshi
2015/0304257 A1 10/2015 O'Neil
2016/0173662 A1 6/2016 Seok
2017/0093811 A1 3/2017 Dolev et al.
2017/0134937 A1 5/2017 Miller
2017/0188114 A1 6/2017 Bibayoff
2018/0219913 A1 8/2018 Manasse
2018/0351853 A1 12/2018 Usui
2018/0359811 A1 12/2018 Verzun

OTHER PUBLICATIONS

USPTO, ISA/US, "Notification of Transmittal of the ISR and the Written Opinion of the International Searching Authority, or the Declaration," in PCT Application No. PCT/US2018/042972, dated May 16, 2019, 10 pages.
European Patent Office, "Communication pursuant to Art. 153(7) EPC", in European Application No. 18835709.9, Mar. 30, 2021, 8 pages.

* cited by examiner

SYSTEMS AND METHODS FOR PACKET SPREADING DATA TRANSMISSION WITH ANONYMIZED ENDPOINTS

CROSS REFERENCE TO RELATED APPLICATIONS

This Application, Ser. No. 19/006,031 is a Continuation of, and claims the benefit and priority of application Ser. No. 18/392,125, filed on Dec. 21, 2023, entitled "Systems and Methods for Packet Spreading Data Transmission with Anonymized Endpoints", the contents of which are incorporated herein in its entirety by this reference.

Application Ser. No. 18/392,125 is a Continuation of, and claims the benefit and priority of application Ser. No. 18/115,334, filed on Feb. 28, 2023, the contents of which are incorporated herein in its entirety by this reference.

Application Ser. No. 18/115,334 is a Continuation of, and claims the benefit and priority of application Ser. No. 17/341,321, filed on Jun. 7, 2021, the contents of which are incorporated herein in its entirety by this reference.

Application Ser. No. 17/341,321, is a Continuation of, and claims the benefit and priority of application Ser. No. 16/039,243, filed on Jul. 18, 2018, entitled "Systems and Methods For Packet Spreading Data Transmission With Anonymized Endpoints", now U.S. Pat. No. 11,082,408, issued Aug. 3, 2021, which claims the benefit of U.S. Provisional Application No. 62/535,206 filed on Jul. 20, 2017, entitled "Systems and Methods For Packet Spreading Data Transmission With Anonymized Endpoints" the contents of which are incorporated in their entirety by this reference.

BACKGROUND

The present invention relates to computer data security and, in particular, to a systems and methods for dramatically improved security and privacy of data packets traveling through open networks.

Given the combination of global network connectivity, exponential growth in the number of network accessed devices and databases, Moore's Law continually driving down computing cost and increasing computational density, and the rapidly looming realization of quantum computing—government, commercial and personal communications are threatened in a way that was perhaps inconceivable only a few years ago.

Rogue actors, e.g., encryption crackers or malicious hackers, pose a threat in the cyber realm for any device connected to a network. It is not hard to conceive the potential threat of mass hacking of the coming generation of autonomous cars, trucks, aerial vehicles, industrial robots, home robots, and smart appliances. Increasingly, our world and our lives depend on our ability to protect sensitive data and communications.

Recent cyber attacks such as the massive disruption of Ukraine's power grid in 2015, the hacking of Democratic National Committee emails in 2016, and the 2017 global ransom-ware attacks make it plainly clear of the wide ranging risks to any user active in cyber-space.

It is therefore apparent that an urgent need exists for improved security and privacy of data packets traveling through open networks.

SUMMARY

In accordance with the present invention, data packets to be delivered through an open network, such as the Internet, are encrypted and pseudo-randomly divided across numerous sub-packets, each of which travels through a separate communications channel, to a respective obscured address. The sub-packets are all delivered to a single endpoint system, which then decrypts the sub-packets, reassembles the sub-packets to reconstruct the original encrypted packet, and decrypts the encrypted packet to reconstruct the original packet.

Splitting a data packet into multiple sub-packets and sending those sub-packets through different channels produces benefits similar to those produced in the non-analogous art of frequency spreading in radio transmission. Included in these benefits are Low Probability of Detection (LPD), Low Probability of Intercept (LPI), and Low Probability of Exploitation (LPE).

Splitting a data packet into multiple sub-packets allows the sub-packets to hide amongst other data packets traveling through the endpoint system contemporaneously. In addition, data from multiple sources can be commingled in sub-packets. Such disguises the sub-packets, providing a low probability of detection.

By sending the sub-packets over different communications channels, e.g., between different phantom addresses associated with the involved endpoint systems through reverse proxy, an adversary must collect packets from countless communications channels to intercept the entirety of a single original packet.

Even if an adversary manages to intercept the entirety of a data packet, the manner in which the original data packet is split into sub-packets is highly randomized and cryptographically secure. Accordingly, the spreading of data packets in accordance with the present invention provides a low probability of exploitation.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
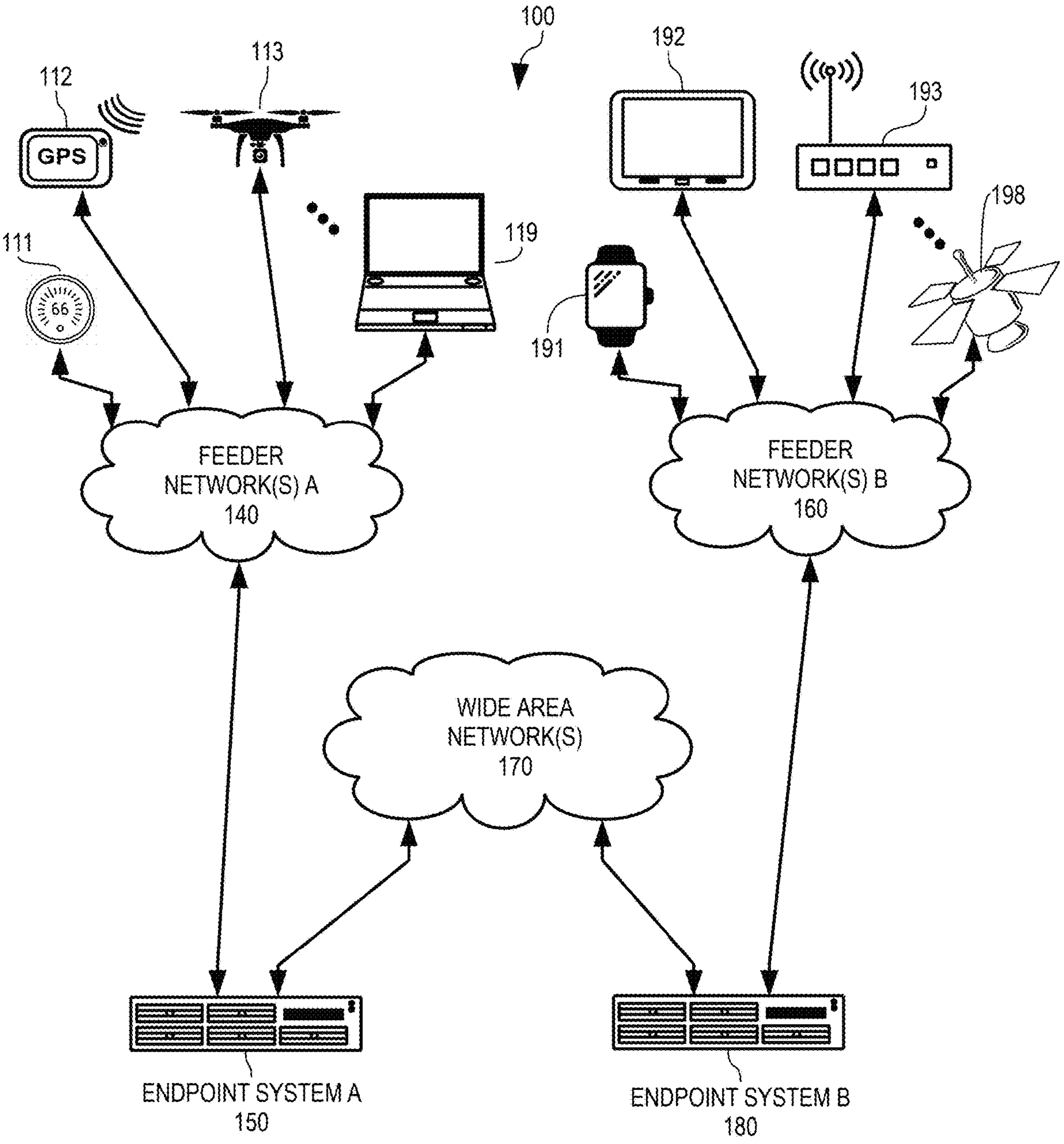
FIG. 1 illustrates an exemplary embodiment of an Ecosystem for packet-spreading encrypted data transmission system(s) with anonymized endpoint systems, in accordance with the present invention.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

In accordance with the present invention, data packets to be delivered through an open network, such as the Internet, are encrypted and pseudo-randomly divided across numerous sub-packets, each of which travels through a separate communications channel, sometimes referred to herein as a "stream", to a respective obscured address. The sub-packets are all delivered to a single endpoint system, e.g., endpoint system B 180 (FIG. 1), which then decrypts the sub-packets, reassembles the sub-packets to reconstruct the original encrypted packet, and decrypts the encrypted packet to reconstruct the original packet.

The techniques for securing data packets produces benefits similar to those produced in the non-analogous art of frequency spreading in radio transmission. Included in these benefits are Low Probability of Detection (LPD), Low Probability of Intercept (LPI), and Low Probability of Exploitation (LPE).

Transmitted radio signals can achieve very low probability of detection by various signal encoding and frequency spreading techniques, even so as to lower the observable radio energy to levels below the background noise floor. Because digital communications have no inherent noise floor in the sense of radio's cosmic background radiation, the act of communication cannot be hidden this same way. What can be done, and what the features outlined herein explain, are ways to attain similar obscurity in the digital realm where packet traffic is entirely detectable by an adversary.

A second virtue of spread spectrum transmission of radio signals is that an adversary who manages to detect transmissions finds the multitude of rapidly changing transmission frequencies to be a technical barrier to interception (LPI). This is a subtle and significant aspect worthy of careful understanding. It is more difficult for the user's radio to hop from frequency to frequency. Fortunately, the complexity of code-driven dynamic frequency selection is moderate—it is perhaps 10× or 100× more work to build radios using thousands or millions of frequencies. The eavesdropping effort for the adversary, however, is proportional to the number of possible frequencies, which might be a thousand or million rather than one. This asymmetry is a double virtue—the data is very hard for an adversary to capture and it is much harder proportionally for the adversary to capture than the owner to send and receive.

In a manner described more completely below, endpoint system A 150 spreads incoming packets into a multiplicity of smaller sub-packets and sends these through different communications channels, e.g., to different IP addresses. By using reverse proxy, it is possible to have thousands of phantom addresses among which the spread sub-packets of many parallel communications are sent. Though thousands or tens of thousands of such IP addresses are fewer than millions of tunable radio frequencies, it has the same asymmetric dynamic versus an adversary—the adversary must capture data sent to many times the number of destination addresses in order to have any hope of intercepting a decodable communication.

The third aspect of spread spectrum is that a dedicated adversary who has managed to detect a spread transmission and record its many tendrils must also reassemble the conversation in much the same way as "unshredding paper" (LPE). While maximizing information security in this area was quite difficult for analog-era radios, in our digital network context, this problem is readily addressed by digital data encryption techniques. Even so, the benefit of highly skewed asymmetric cost/effort advantage mentioned previously motivates several features in endpoint systems A 150 and B 180 to make exploiting packet data highly impractical. These features are described below.

The intrinsic security of such an ecosystem begins with truly private communication—between arbitrary devices, across open networks, and even application to application. This privacy combines the strength of data encryption, benefits of spread spectrum radio (low probabilities of detection, interception, and exploitation), defenses against traffic analysis in packet-switched networks, and mechanisms against attacks by full-knowledge insiders and unbounded-computation outsiders. This is done without change to installed systems—unparalleled protection with no operational complexity.

The incorporation of validated data encryption (AES-256/GCM, SPECK, SIMON) and hash techniques (SHA-256/512, SHA3-256/512) additionally enhances secure information management. These are valuable elements in communication encryption, but they cannot per se provide communication privacy. In other words, while validated data encryption and hash techniques are valuable for communication privacy, there are not sufficient for communication privacy. This greater goal requires frustrating adversarial traffic analysis, hampering adversarial capture of data in flight, and as much as possible, hiding the very act of communication from an adversary.

As described more completely herein, endpoint systems A 150 and B 180 deliver communication privacy by using trusted security elements in a framework inspired by spread-spectrum radio technology. So inspired, we (i) fuse packet from and to address pairs to define a distinct communications channel as an analogy to a single frequency and (ii) encrypt and spread packets across a range of such communications channels, with phantom sub-packet header addresses to obscure the original endpoints. These steps, along with further processing described herein, assure private communication across untrusted networks.

Architecture—Functional Overview

As described in greater detail below with respect to logic flow diagram 204 (FIG. 3), the basic sending function of an Endpoint system is to receive packets from devices, encrypt, and spread the encrypted bits to sub-packets, which are then encrypted and assigned packet headers that obscure the original endpoints. The resulting sub-packets are sent to phantom addresses that reverse proxy to an Endpoint at the destination. As described in greater detail below with respect to logic flow diagram 208 (FIG. 4), the basic receiving function for packets from other Endpoint devices reverses these processing steps: sub-packets are gathered, decrypted, and validated, the cohort is "unspread," decrypted and validated. The reconstructed original packet is then output from the device-side of the Endpoint system.

FIG. 1 illustrates an exemplary Ecosystem 100, in accordance with one embodiment of the present invention. The device side of an endpoint system is its "outer side"; the network side between endpoints is its "inner side". Many devices can be on the outer sides, so N devices $A_1$, $A_2$, . . . $A_N$ (e.g., protected devices 111-119) and M devices $B_1$, $B_2$, . . . $B_M$ (e.g., protected devices 191-198) at endpoints A and B (e.g., Endpoint system A 150 and Endpoint System B 180, respectively), create completely private communication between the M*N pairs of devices on the outer sides of the endpoint systems. Multiple networks can be used on the inner sides (e.g., Feeder Network(s) A 140 and Feeder Network(s) B 160) as well as on the outer sides (e.g., Wide-Area Network(s) (WAN) 170) of the endpoint systems, by direct network attachment or by ordinary routing mechanisms.

Note the terms "protected device", "protected system", "outer side device", and "outer side system" may be utilized interchangeably and refer to a computerized and network connectable system devised or intended in part for automated operation composed of hardware (e.g., processor, memory, sensors and input/output devices) and programmed instructions for operation (e.g., software, firmware, microcode). A protected device can, for example, be a 'smart device' such as augmented reality display goggles connected to a network of other computerized systems. In some embodiments, a 'protected device' or 'outer side device' can refer to a virtual device composed of a system(s) of interconnected devices, wherein communication from such a system(s) of interconnected devices with other separate external device(s) or system(s) may be protected by an endpoint.

Illustrative arbitrary devices 111-119 and 191-199 in FIG. 1 provide examples of such protected devices. Protected devices can include, for example: digital home devices (e.g., smart thermostat 111); satellite enabled devices (e.g., GPS guidance system 112); semi-autonomous, autonomous, and remote controlled vehicles (e.g., aerial drone 113); commercial and personal computer systems (e.g., laptop computer 119); body-attached or body-embedded computerized devices (e.g., smart watches 191); mobile devices (e.g., tablet computer 192); network access devices (e.g., WIFI router 193); and remotely accessed devices and sensors (e.g., satellite 199). These are just a few illustrative examples. Any computerized device with a network connection can be a protected device.

Processing Example

Figure 2:
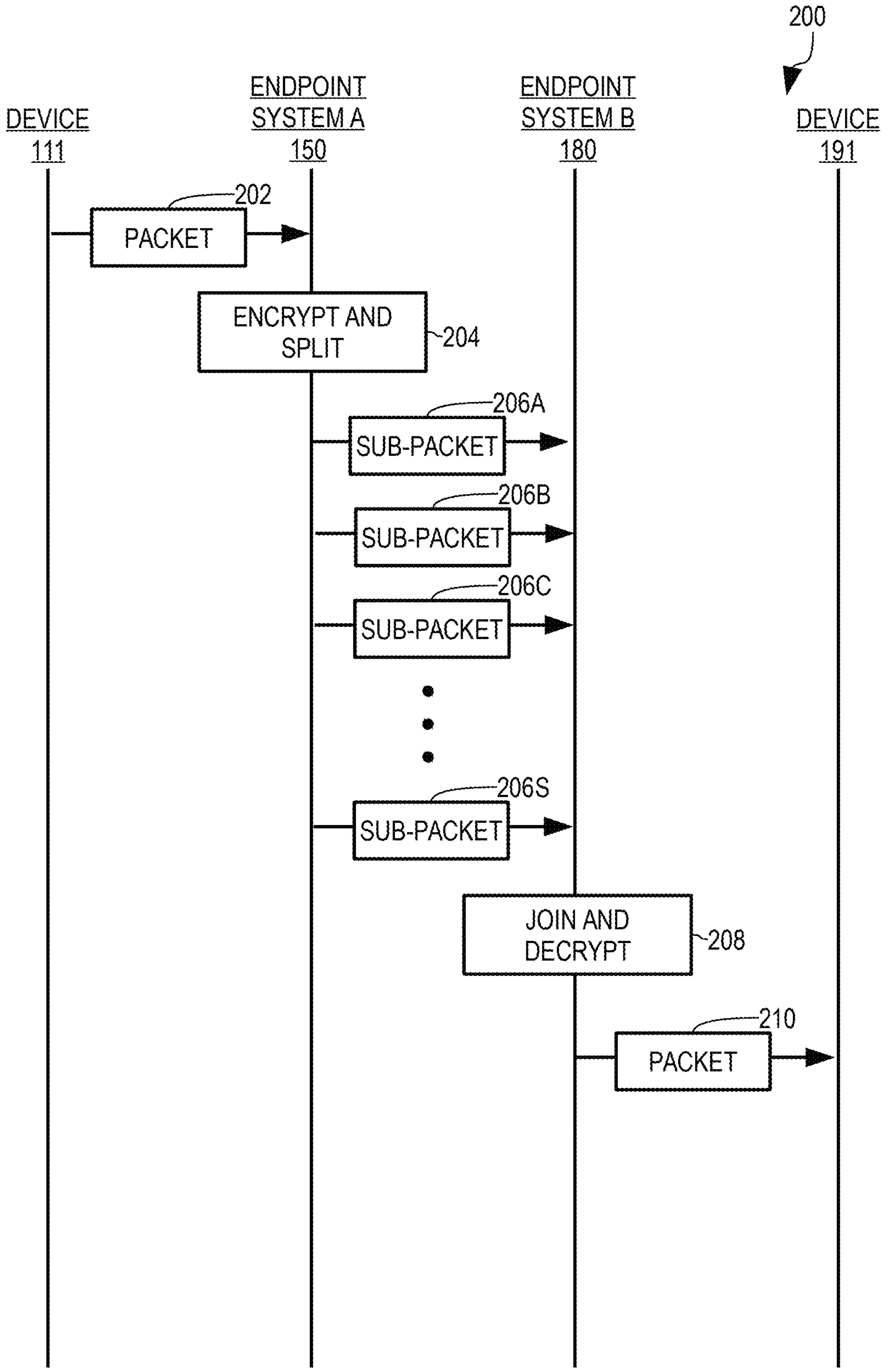
FIG. 2 is a transaction flow diagram illustrating transmission between endpoint systems of FIG. 1 in accordance with the present invention.

To explain basic Endpoint processing, let's trace a packet from device to network through this structure as illustrated in transaction flow diagram 200 (FIG. 2). In the illustrative example of transaction flow diagram 200, a data packet is sent from device 111 to device 191 through endpoint systems A 150 and B 180. Though the steps are described sequentially, implementation is actually concurrent.

In step 202, an input packet is received by endpoint system A 150 from a device-side network connection, e.g., from device 111.

In step 204, which is described below in greater detail in conjunction with logic flow diagram 204 (FIG. 3), endpoint system A 150 splits the input packet into S sub-packets and sends those sub-packets, each through a respective communications channel, to endpoint system B 180. This is illustrated as steps 206A-S.

In step 208, which is described below in greater detail in conjunction with logic flow diagram 208 (FIG. 5), endpoint system B 180 joins the sub-packets to reconstruct the packet as encrypted by endpoint system A 150 and decrypts that packet to reconstruct the packet as it was originally received by endpoint system A 150 in step 202.

Figure 3:
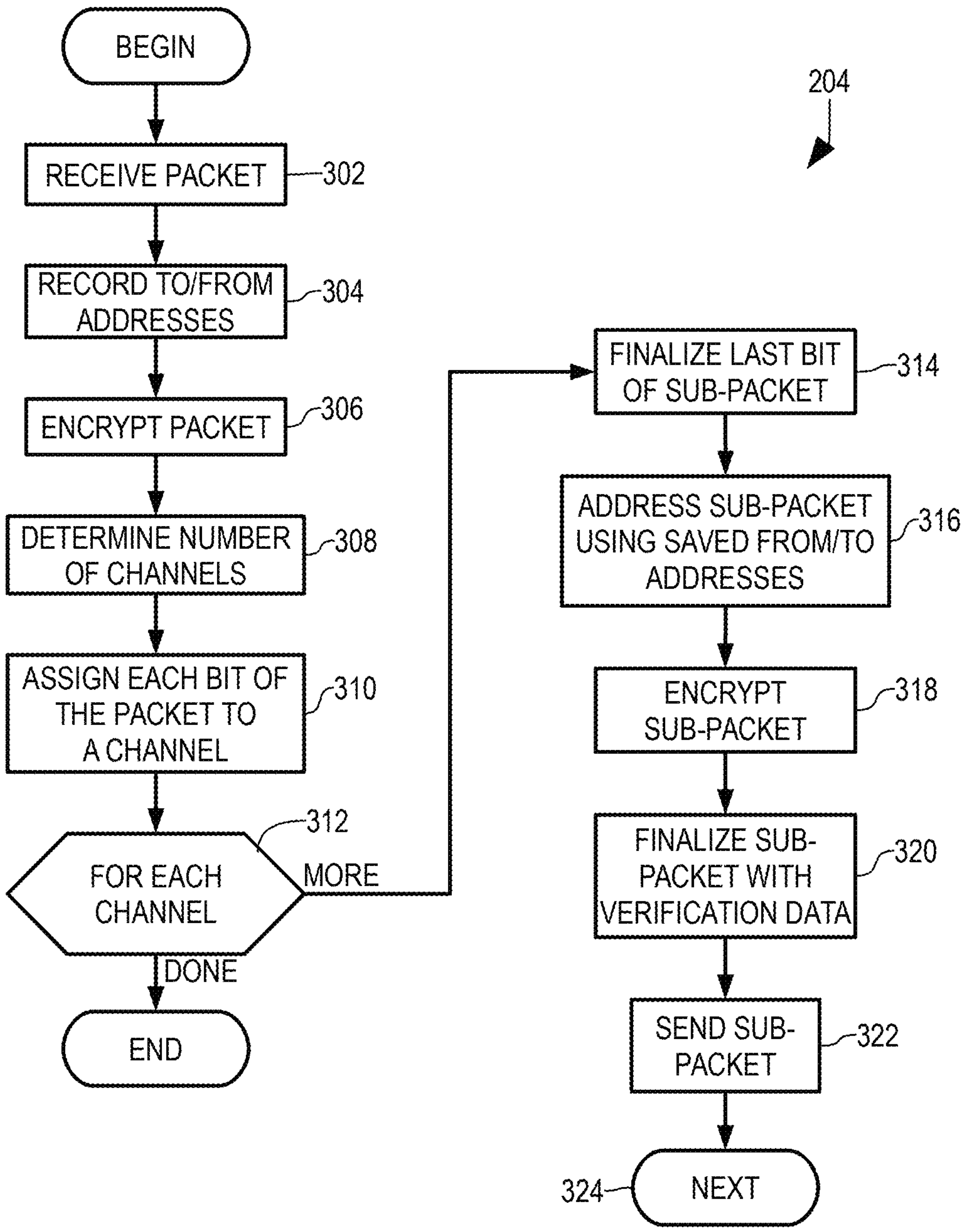
FIG. 3 is a logic flow diagram illustrating a step of FIG. 2 in greater detail.

Step 204 is shown in greater detail as logic flow diagram 204 (FIG. 3). In step 302, endpoint system A 150 receives a data packet, e.g., from device 111 (FIG. 1) in this illustrative example. In step 304 (FIG. 3), endpoint system A 150 records source and destination addresses from the packet, since encrypting the packet in step 306 will obscure those addresses and the sub-packets must still travel toward the original destination of the packet.

In step 306, endpoint system A 150 encrypts the packet. The encryption of step 306 is sometimes referred to as the outer encryption because the encryption relates to the outer-, device-side of endpoint system A 150. In this illustrative embodiment, this outer encryption is the known AES-256 encryption technique in Galois/Counter Mode (GCM). AES-256 and GCM are known and are not described herein. The key used in outer encryption, i.e., the outer key, can be a single key used by all endpoint systems when communicating with one another or can be specific to each endpoint system or to each pair of endpoint systems. "AES256:32Bytes567890123456_OUTER" is an illustrative example of an outer key shared by endpoint systems A 150 and B 180.

In step 308, endpoint system A 150 determines a number of communications channels among which to divide the encrypted packet. The number of channels can be predetermined and fixed or can be determined according to one or more characteristics of the encrypted packet. In one illustrative embodiment, endpoint system A 150 selects a number of channels such that the encrypted packet, when divided into that number of sub-packets, results in sub-packets having sizes that are no less than a predetermined minimum sub-packet size and no more than a predetermined maximum sub-packet size.

In step 310, endpoint system A 150 assigns each bit of the encrypted packet to one of the sub-packets using a reversible selection mechanism, such as a seeded pseudo-random number generator. Using the same seeded pseudo-random number generator, endpoint system B 180 can divine which position within a whole packet each bit of each sub-packet belongs.

In embodiments described more completely below, endpoint system A 150 can employ any of a number of techniques in step 310 to further obscure the substantive, payload data in the various sub-packets, such as bit insertion and stream interdependence, for example.

After step 310, each of the sub-packets includes all the bits of its intended data payload. Loop step 312 and next step 324 define a loop in which endpoint system A 150 processes each of the sub-packets according to steps 314-322. During a particular iteration of the loop of steps 312-324, the particular sub-packet processed by endpoint system A 150 is sometimes referred to as the subject sub-packet in the context of logic flow diagram 204.

In step 314, endpoint system A 150 finalizes the last bit of the data payload of the subject sub-packet.

In step 316, endpoint system A 150 addresses the subject sub-packet using source and destination addresses recorded in step 304. In particular, since the packet originates on the device side of endpoint system A 150, the FROM: address for the subject sub-packet is an address of endpoint system A 150. Since the packet is destined for device 191 on the device side of endpoint system B 180, the TO: address for the subject sub-packet is an address of endpoint system B 180.

In this illustrative embodiment, endpoint systems A 150 and B 180 are each associated with a plethora (e.g., thousands or even tens of thousands) of IP addresses, e.g., each through one or more reverse proxy servers. Also in this illustrative embodiment, a communications channel between endpoint systems A 150 and B 180 is defined by a pair of addresses: one associated with endpoint system A 150 as the source and one associated with endpoint system B 180 as the destination.

In step 318, endpoint system A 150 encrypts the subject sub-packet. The encryption of step 318 is sometimes referred to as inner encryption, using an inner key. In step 320, endpoint system A 150 finalizes the subject sub-packet, including adding GCM verification data.

In step 322, endpoint system A 150 sends the finalized sub-packet through WAN 170 as addressed in step 316. Each performance of step 322 is represented by a respective one of steps 206A-S (FIG. 2).

Once endpoint system A 150 has processed all sub-packets according to the loop of steps 312-324, processing according to logic flow diagram 204, and therefore step 204 (FIG. 2), completes.

Figure 4:
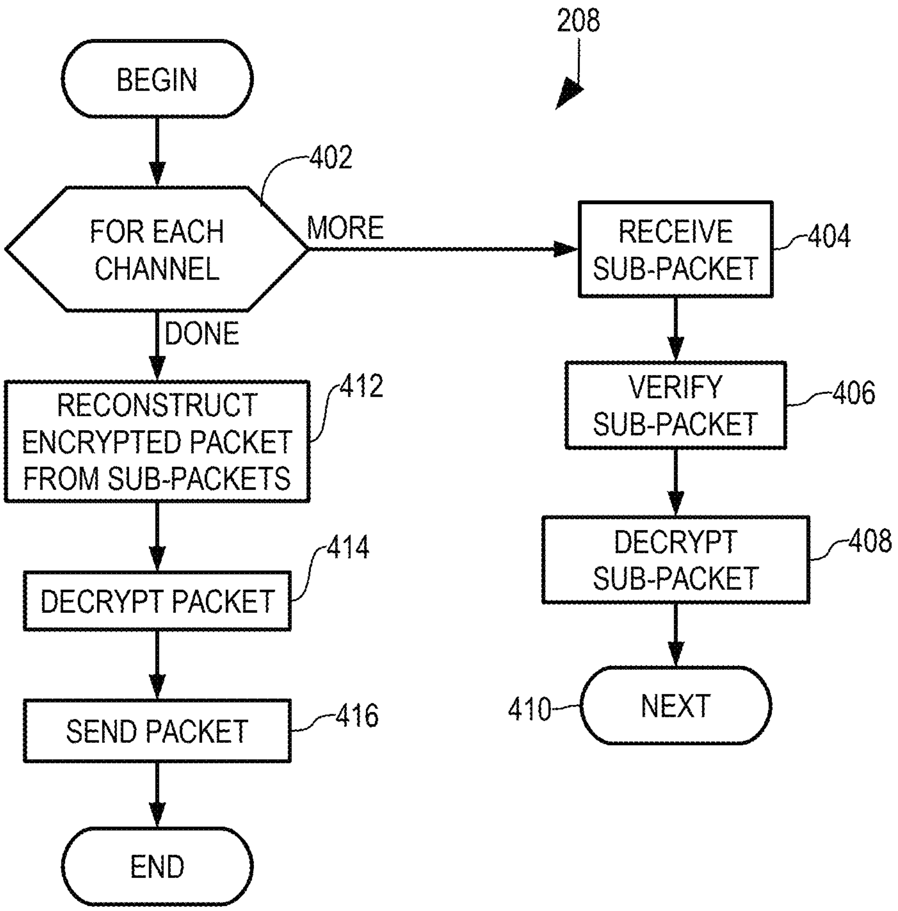
FIG. 4 is a logic flow diagram illustrating a step of FIG. 2 in greater detail.

As described above, endpoint system B 180 joins the received sub-packets and decrypts the joined packet in step 208 (FIG. 2). Step 208 is shown in greater detail in logic flow diagram 208 (FIG. 4).

Loop step 402 and next step 410 define a loop in which endpoint system B 180 processes the sub-packet of each channel according to steps 404-408. During a given iteration of the loop of steps 402-410, the particular sub-packet processed by endpoint system B 180 is sometimes referred to as the subject sub-packet in the context of logic flow diagram 208.

In step 404, endpoint system B 180 receives the subject sub-packet. In step 406, endpoint system B 180 verifies that the subject sub-packet as received is complete and error-free using the GCM verification data of the subject sub-packet. In step 406, endpoint system B 180 decrypts the subject sub-packet, i.e., applies the reverse of the inner encryption applied by endpoint system A 150 in step 318 (FIG. 3).

Once endpoint system B 180 has processed all sub-packets according to the loop of steps 402-410, processing transfers to step 412.

In step 412, endpoint system B 180 joins the decrypted sub-packets to reconstruct the encrypted packet formed by endpoint system A 150 in step 306 (FIG. 3). The joining is the reverse of the splitting of bits of the encrypted packet as described above with respect to step 310, including reversal of any techniques described below such as bit insertion and stream interdependence.

In step 414 (FIG. 4), endpoint system B 180 decrypts the reconstructed encrypted packet, applying the outer encryption techniques and the outer key used by endpoint system A 150 in step 306 (FIG. 3). The result of step 414 (FIG. 4) is an accurate reproduction of the packet received by endpoint system A 150 in step 302 (FIG. 3), including the original source and destination addresses in its headers. In step 416 (FIG. 4), endpoint system B 180 sends the packet to its destination, e.g., device 191 (FIG. 1).

The following example illustrates the secure, spread spectrum transmission from endpoint system A 150 to endpoint system B 180. For our input "packet," we will use Lord Byron's timeless poem, She Walks in Beauty, to illustrate the transformation of each Endpoint encoding step:

She Walks in Beauty - by George Gordon, Lord Byron
She walks in beauty, like the night
Of cloudless climes and starry skies;
And all that's best of dark and bright
Meet in her aspect and her eyes;
Thus mellowed to that tender light
Which heaven to gaudy day denies.
One shade the more, one ray the less,
Had half impaired the nameless grace
Which waves in every raven tress,
Or softly lightens o'er her face;
Where thoughts serenely sweet express,
How pure, how dear their dwelling-place.
And on that cheek, and o'er that brow,
So soft, so calm, yet eloquent,
The smiles that win, the tints that glow,
But tell of days in goodness spent,
A mind at peace with all below,
A heart whose love is innocent!

An exemplary step-by-step encoding process described above is illustrated by Appendix A. At page 1 of Appendix A, the data payload of the packet received in step 302 (FIG. 3) is shown under the heading, "read 702 input bytes from file walk.txt".

The results of outer encryption by endpoint system A 150 in step 306 is shown at page 2 of Appendix A.

Pages 3-4 of Appendix A show the encrypted packet divided into eight (8) sub-packets, each encrypted with inner encryption and with added GCM verification data.

Page 5 of Appendix A shows the same eight (8) sub-packets received by endpoint system B 180. Page 6 of Appendix A shows the sub-packets after inner decryption by endpoint system B 180. Page 7 of Appendix A shows the reconstructed encrypted packet resulting from step 412 (FIG. 4) by endpoint system B 180.

Inspection shows that the 702-byte poem grows to 857 bytes when encrypted and spread 8 ways to form the encrypted sub-packets. This 155-byte (22%) expansion represents verification data added by the GCM chosen for both inner and outer encryptions, and, by up to 7 random bits per stream—8 streams in this case—used as padding for partial final bytes after spreading in step 314 (FIG. 3). This overhead is roughly fixed irrespective of packet size; for a 64 kb input packet, this 155-byte expansion is a slight 0.2365% overhead.

Endpoint systems A 150 and B 180 can operate in any of a number of modes in device-side communications.

Invisible mode is the default mode in this illustrative embodiment. In invisible mode, endpoint system A 150 can serve a large network of devices with no special participation by the devices involved, which means that it is "invisible" to its clients while offering a large suite of privacy and security benefits. Devices, e.g., devices 111-119 (FIG. 1), operate exactly as they currently operate in conventional networks, with no changes to configuration or behavior.

In this mode, endpoint system A 150 examines packet destination addresses to see if they match specified addresses or are within specified ranges of addresses that are known by endpoint system A 150 to be served by another endpoint system. See, e.g., IP addresses 608 (FIG. 6) of a peer record 604 described below. If there is a match, endpoint system A 150 processes the packet in the manner described above with respect to FIG. 3. The resulting sub-packets are sent to phantom addresses at the destination, where they are automatically routed to an endpoint system such as endpoint system B 180, which receives and processes the sub-packets in the manner described above with respect to FIG. 4. In this way, any two devices, e.g., devices 111-119 and 191-198, connected to WAN 170 through endpoint systems as described herein gain full communication privacy protection between each other without awareness or change to any computer, software, or network equipment.

Visible mode is an optional mode in this illustrative embodiment. Despite the convenient operational advantages of invisible mode, there are additional benefits to be gained in cases where circumstances allow security or programming staff to configure systems to proactively interact with the endpoint system directly.

Suppose, for example, that feeder network A 140 is not entirely trusted. Communications between devices 111-119 and endpoint system A 150 would be vulnerable to detection, interception, and exploitation. To address such a vulnerability, endpoint system A 150 can be made "visible", i.e., its presence made known to devices 111-119, and devices 111-119 can be configured to communicate with endpoint system A 150 using only secure communications, such as a known SSL connection. In this secure A-to-Endpoint arrangement, the device can communicate securely with endpoint system A 150, and then through endpoint system A 150, to any device beyond another endpoint system. Exclusive use of secure communications between the device and endpoint system A 150 both (i) obscures the data exchanged therebetween and (ii) obscures metadata specifying the purpose and intent of the data. For example, if an adversary intended to attack a device attached to feeder network A 140 that performs a particular service (e.g., a database server serving high value data), use of SSL communications between the device and endpoint system A 150 hides the identity of the device as one that performs that particular service.

Figure 5:
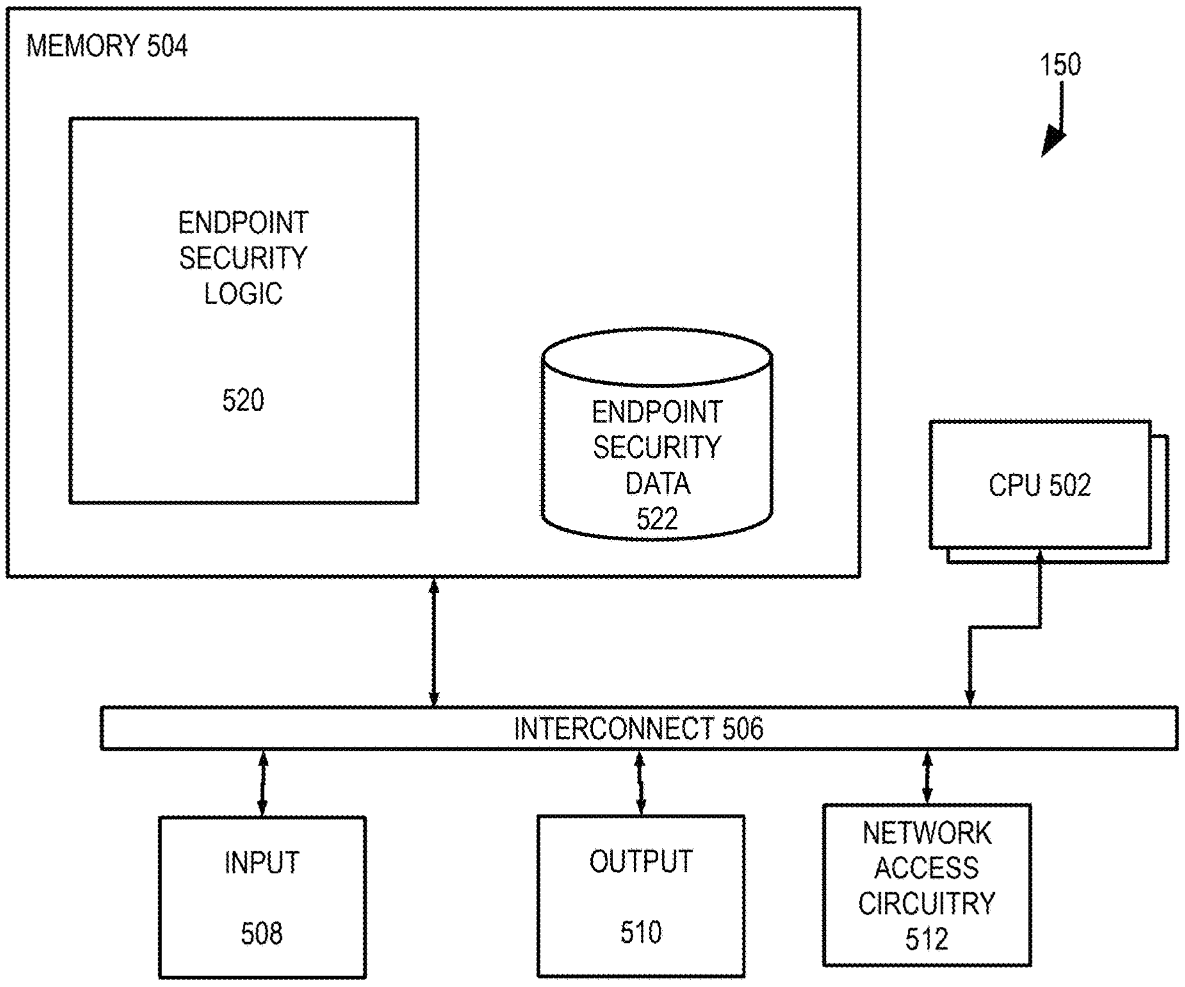
FIG. 5 is a block diagram illustrating an endpoint system of FIG. 1 in greater detail.

Endpoint system A 150 is shown in greater detail in FIG. 5. Endpoint systems A 150 and B 180 are analogous to one another and description of one is equally applicable to the other unless otherwise noted herein. Endpoint system A 150 includes one or more microprocessors 502 (collectively referred to as CPU 502) that retrieve data and/or instructions from memory 504 and execute retrieved instructions in a conventional manner. Memory 504 can include generally any computer-readable medium including, for example, persistent memory such as magnetic and/or optical disks, ROM, and PROM and volatile memory such as RAM.

CPU 502 and memory 504 are connected to one another through a conventional interconnect 506, which is a bus in this illustrative embodiment and which connects CPU 502 and memory 504 to one or more input devices 508, output devices 510, and network access circuitry 512. Input devices 508 can include, for example, a keyboard, a keypad, a touch-sensitive screen, a mouse, a microphone, and one or more cameras. Output devices 510 can include, for example, a display—such as a liquid crystal display (LCD)—and one or more loudspeakers. Network access circuitry 512 sends and receives data through computer networks such as feeder network A 140 (FIG. 1) and WAN 170. Generally speaking, server computer systems and network nodes often exclude input and output devices, relying instead on human user interaction through network access circuity such as network access circuitry 512. Accordingly, in some embodiments, endpoint system A 150 does not include input device 508 and output device 510.

A number of components of endpoint system A 150 are stored in memory 504. In particular, endpoint security logic 520 is all or part of one or more computer processes executing within CPU 502 from memory 504 in this illustrative embodiment but can also be implemented using digital logic circuitry. As used herein, "logic" refers to (i) logic implemented as computer instructions and/or data within one or more computer processes and/or (ii) logic implemented in electronic circuitry.

Endpoint security data 522 is data stored persistently in memory 504 and can each be implemented as all or part of one or more databases.

Endpoint security logic 520 causes endpoint system A 150 to behave as described herein, including processing packets received from its device side as shown in FIG. 3 and processing packets received from its network side as shown in FIG. 4.

Endpoint security data 522 includes data that controls details of the behavior specified by endpoint security logic 520, e.g., inner and outer keys, the specific types of inner and outer encryption, and phantom addresses of known endpoint systems. In particular, endpoint security data 522 is shown in greater detail in FIG. 6.

Endpoint security data 522 includes peer data 602, which stores data that is helpful in communicating with other endpoint systems in the manner described herein. In particular, peer data 602 includes a number of peer records, such as peer record 604. In this illustrative example, peer record 604 stores data specific to endpoint system B 180 (FIG. 1).

Shared random data 606 is a collection of randomized bits shared between endpoint systems A 150 and B 180. In other words, endpoint system B 180 stores an exact copy of shared random data 606 in a peer record corresponding to endpoint system A 150. IP addresses 608 stores a collection of IP addresses, all of which ultimately lead to the endpoint system corresponding to peer record 604, e.g., endpoint system B 180 in this illustrative example. Keys 610 stores data representing a number of cryptographic keys used by endpoint system B 180 in the manner described herein.

Beyond the description above of the behavior of endpoint systems A 150 and B 180 in providing significantly improved communications security, a number of implementation details can further improve such security.

As described above with respect to logic flow diagram 204 (FIG. 3), the sending endpoint system, e.g., endpoint system A 150, determines a number of sub-packets into which to divide the packet in step 308. This number can be somewhat arbitrary. The cost, in terms of processing resources, to send a packet is proportional only to the size of the packet and not the number of sub-packets into which the packet is split. Accordingly, there is little motivation to minimize the number of sub-packets. What does increase with splitting a packet into sub-packets is the number of extra bits used to finalize the last byte of each sub-packet and the Galois/Counter Mode wrapper used to verify sub-packets after receipt, e.g., by endpoint system B 180. Each of these costs offers little motivation to minimize the number of streams as is explained in discussions regarding Quality of Service and internal channels further below.

When S number of streams are used, an adversary must capture each, must decrypt each, must merge bits of the streams in the proper order, and then must decrypt the reconstructed stream properly. Without the key/seed from which the pseudo-random number generator of steps 310 (FIG. 3) and 412 (FIG. 4) is initialized, the number of possible arrangements is $S^b$ wherein S is the number of streams and b is the length of the packet received in step 302 in bits. $S^b$ exceeds the key space of 256- and 512-bit keys for even the smallest messages when S is much larger than 1. That complexity grows exponentially in S, motivating a larger number of streams.

Streams spread by the bit steering process (in step 310 as described above) are naturally independent. However, the streams can be made to be highly interdependent as described below in the description of Stream Dependence. Interdependent streams cause adversaries an exploitation-complexity increase of at least S factorial (S!). For 32 streams, this factor is $2^{117}$ and, for 64 steams, it is $2^{295}$, which exceeds the square of the brute force key space attack effort for AES-128.

One additional feature of streams is that sub-packets can be aggregated into a single stream as desired. In other words, sub-packets can be assigned to streams in the same general manner in which packet bits are assigned to sub-packets in step 310, pseudo-randomly assigning more than one sub-packet to some or all streams. This allows for a logical number of streams greater than the physical number of streams. Normally the ratio of sub-packets to streams is 1:1, i.e., one sub-packet per stream. But in cases where small packets are inefficient to transmit, where fewer destination addresses are preferred, or where packet size is to be tightly controlled, sub-packet aggregation allows a larger number of logical streams to be merged into a smaller number of physical streams.

Another way in which an endpoint system can further obfuscate data in sub-packets is Stream Order manipulation. Spreading an input packet in input order, whether by bits or bytes, to the sub-packets has the effect that no matter how randomly the data is spread between the sub-packets, the input packet order is kept in the sub-packets. For example, an input of "abcdefgh" spread two ways might yield a random "aceg" and "bdfh". But in each case, substream letters appear in the same transitive order as input (a before c before e before g, for example). In the manner described above, it is not cleartext bytes that are shuffled, but bits in a strongly encrypted cipher text. Yet, the same monotonicity persists. For this reason, endpoint systems A 150 and B 180 support fair shuffles before spreading (step 310) and/or before inner encryption (in step 318). Such shuffling allows bits to appear out-of-order so that each inner cyphertext byte could be dependent on any input byte.

In some embodiments, endpoint systems A 150 and B 180 implement Stream Dependence. As described above with respect to logic flow diagram 208 (FIG. 4), once device packet data is spread to sub-packets, those sub-packets are generally processed independently. However, endpoint systems A 150 and B 180 can create cross-stream data interdependencies, increasing the burden of adversarial data analysis and exploitation. Examples of cross-stream data interdependencies include cross-stream functions and cross-stream exchanges.

Regarding cross-stream functions, any sub-packet can be replaced with an invertible function of itself and other data. In particular, encryption in step 318 (FIG. 3) can be replaced or augmented with any function applied to the data payload of the sub-packet so long as the function can be inverted in step 408 (FIG. 4) to recover the original sub-packet payload.

The primary goal in increasing cross-stream data interdependence is not as much cryptographic strengthening as it is forcing an adversary to have data for all of the streams and the knowledge of function configuration, which present more than S factorial alternatives. With all interdependence processing nestled between inner and outer encryptions, overall cryptographic strength is not weakened. Yet, the key- and pair-dependent changes increase the effective block size to total message size, strengthening against cryptographic attack.

In the following illustrative example, endpoint system A 150 modifies bytes of a sub-packet based on the values of bytes in other chosen sub-packets in the manner illustrated by the following Go-language code:

```
for i := range stream[a] { // arbitrary streams a, b, c          (1)
  // arbitrary b offset
  bByte := stream[b][(i + bOffset) % len(stream[b])]
  // arbitrary c offset
  cByte := stream[c][(i + cOffset) % len(stream[c])]
  // operators can be add, subtract, exclusive-or, ...
  stream[a][i] ^= bByte + cByte
}
```

In source code excerpt (1), the order in which stream indices a, b, and c are chosen, whether they span a subset of streams or span streams multiple times, the value of positional offsets bOffset and cOffset, and the operators (ADD, SUB, XOR, ROT) used to bind the streams together byte-by-byte are key-driven choices. This interdependence function need not be algebraic in nature. The substitution box of symmetric key algorithms is an able mechanism. In S-Box (Substitution Box) mode, endpoint system A 150 replaces data in stream a invertibly with reference to a substitution box whose input comes from a and another stream:

```
for i, aByte := range stream[a] { // arbitrary streams a, b          (2)
  // arbitrary offset
  bByte := stream[b][(i + bOffset) % len(stream[b])]
  stream[a][i] = SBOX(aByte, bByte)
}
```

In yet another embodiment, endpoint system A 150 draws from other streams or sources, permitting use of non-invertible, one-way substitutions:

```
for i := range stream[a] { // arbitrary streams a, b, c          (3)
  // arbitrary offset
  bByte := stream[b][(i + bOffset) % len(stream[b])]
  // arbitrary offset
  cByte := stream[c][(i + cOffset) % len(stream[c])]
  // operator can be add, subtract, exclusive-or, ...
  stream[a][i] ^= SBOX(bByte, cByte)
}
```

In other, alternative embodiments, endpoint system A 150 uses permutation operations, such as left and right circular shifts and any of the 40,318 other 8-bit shuffles, to increase cross-stream data interdependence:

```
for i, aByte := range stream[a] { // arbitrary streams a, b          (4)
  // arbitrary offset
  bByte := stream[b][(i + bOffset) % len(stream[b])]
  // rotate left
  stream[a][i] = aByte<<(bByte&0x7) | aByte>>(8-(bByte&0x7)
}
```

Regarding cross-stream exchanges, endpoint system A 150 can exchange data in a given stream with data in other streams. While this mechanical exchange is cryptographically simple, its position between encryptions makes it strong for our purpose. This data exchange can be driven by a keyed pseudo-random number generator as shown in the following Go source code excerpt:

```
for i := range stream[a] { // arbitrary streams a, b                    (5)
  j := (i + bOffset) % len(stream[b]) // arbitrary offset
  If PseudoRandomBit( ) & 1 {
  // swap bytes
     stream[a][i], stream[b][j] = stream[b][j], stream[a][i]
  }
}
```

The cross-stream exchange by endpoint system A 150 can also be driven by the content of other streams, for example:

```
for i := range stream[a] { // arbitrary streams a, b, c, d              (6)
  // arbitrary offset
  j := (i + bOffset) % len(stream[b])
  // arbitrary offset
    cByte := stream[c][(i + cOffset) % len(stream[c])]
  // arbitrary offset
    dByte := stream[d][(i + dOffset) % len(stream[d])]
    If cByte < dByte {
    // swap bytes
      stream[a][i],stream[b][j] = stream[b][i],stream[a][i]
  }
}
```

Whether by cross-stream functions or cross-stream exchanges or a combination of both, it is not the form of interdependence processing that matters so much as its presence. When it is enabled, an adversary suffers greater difficulty exploiting intercepted information.

Aside from encryption, an important attribute of privacy provided by endpoint systems A 150 and B 180 is that of communications privacy. In digital networks, this goal implies resistance to traffic analysis. One dimension of this resistance is obscuring the identity of communication endpoints. Since the IP addresses of packets in transit through open networks are easily observed, endpoint systems A 150 and B 180 replace the actual FROM: and TO: addresses of TCP/IP packets with phantom packet endpoint addresses.

Phantom addresses in this context are IP addresses not associated with physical devices, but are IP addresses in the addressing scheme of networking hardware to which the device attaches. Preferably, reverse proxy configuration is used to redirect packets matching certain addresses or address ranges to a physical endpoint system. For example, a hundred or thousand local IP addresses may be sent to each of endpoint systems A 150 and B 180, and each can accept packets sent to any of these addresses. Similarly, the FROM: address can be modified on transmission. Rewriting packet addresses allows sending and receiving endpoint systems to obfuscate the true endpoints for the packet.

Choices made in the creation of phantom addresses can have significant consequences. As a FROM:TO pair, they create a communication channel allowing receiving endpoint systems to immediately judge certain facts about the packet, ranging from security knowledge to detection of rogue packets. In particular, any packet sent to an endpoint system's phantom addresses from a source other than an endpoint system will be detected as a rogue packet with a certainty greater than 99.99999990686774253 8% merely by header inspection. This means that the endpoint system can reliably detect and reject DOS and DDOS packet floods directed to its phantom addresses at its input line rate.

The restriction in the previous paragraph—i.e., 'directed to its phantom addresses'—is not as restrictive as it may appear. By placing an endpoint system at the Internet- or WAN-facing edge of local area networks and operating the endpoint system in invisible mode without pass-through of non-Endpoint data, an entire data center or range of IP connections becomes protected from DOS/DDOS attacks. In this mode, all data destined for any device on the device-side of the endpoint system is processed by, and therefore addressed to, the endpoint system. Accordingly, because phantom headers handled implicitly at the edge-to-Endpoint interface, phantom headers are free to use the full range of local subnet addresses. This is a configuration option.

In this illustrative embodiment, endpoint systems A 150 and B 180 securely and privately communicate with each other and other endpoint systems through "internal channels." In step 314 (FIG. 3), endpoint system A 150 pads the data payload of the subject sub-packet to fill the predetermined packet size of the sub-packet. In addition, endpoint system A 150 can insert other data into the data payload of a given sub-packet in manners described below. While endpoint system A 150 can insert random data into the sub-packet and endpoint system B 180 can disregard that random data, endpoint system A 150 can alternative insert data to communicate to endpoint system B 180. Inserting such data intended to be communicated to endpoint system B 180 by insertion into sub-packets sent in step 322 constitutes a virtual communications channel that is sometimes referred to herein as an "internal channel." The message can be spread across (i) multiple sub-packets of a given device packet, i.e., from any of devices 111-119, (ii) sub-packets of multiple device packets from multiple devices, and (iii) generally any sub-packets sent to endpoint system B 180 by any performance of the steps of logic flow diagram 204. Internal channels allow endpoint system A 150 and endpoint system B 180 to share any information that they must share to perform the secure data transmission described herein.

Merely inserting bits of an internal message from endpoint system A 150 to endpoint system B 180 to fill sub-packets provides a significant data stream. For example, a 10 mbyte/sec data connection with 64 kb packets spread to 256 streams can convey ~23.9 kb/second via the final-byte internal channel. There are additional circumstances explained subsequently that expand the rate of transport for the internal channels.

Quality of Service

Adversarial traffic analysis is further frustrated by a break in the direct relationship between (i) the size and timing of a packet arriving at the device-side of an endpoint system and (ii) the aggregate size and timing of packets leaving the network-side of the endpoint system. In this illustrative embodiment, endpoint systems A 150 and B 180 break this direct relationship in at least two ways: quality of service (QoS) manipulation as described here and interjection of background data described below.

The term, "quality of service", is well known in networking protocols as a means of promoting rate and latency sensitive data packets over less time-sensitive packets. QoS is generally considered to be a means for superior communication, where greater QoS is a mechanism to get time-sensitive data, such as voice or video data, delivered reliably and on time. Generally, to reduce latency, all data travels with QoS set as high as the data's urgency allows. Contrary to this conventional thinking, endpoint systems A 150 and B 180 select a lower than necessary QoS to slow packet throughput, in effect choosing perverse throughput. For example, choosing an unnecessarily low quality of service is a way to request high latency, low data rate perverse throughput for a packet, for any packets to or from specific addresses, or for all packets.

In conventional thinking, it would seem undesirable to seek lessened QoS. However, perverse throughput is desirable in the context of endpoint systems A 150 and B 180 for many reasons. For example, if an endpoint system is handling low-latency transactional data and latency-tolerant bulk data, such as backup images, bulk email, and other such items, it is beneficial to request the worst acceptable QoS for the latency tolerant data so as to spread such data temporally to the greatest acceptable degree. Such temporal stretching of the transmission of sub-packets reduces the temporal correlation between those sub-packets and the device-side packet from which they were made.

One of the benefits of perverse throughput is breaking the link between bursty input and bursty output. If that data has low QoS, transmission of this data can be spread over seconds, minutes, or even hours. This greatly frustrates traffic analysis by adversaries. In addition, rather than simply holding and slowly sending low QoS packets, the endpoint system A 150 can exploit the internal channels for such communications wherever possible. In this way, multiple, independent data streams are commingled temporally before final stream encryption, greatly frustrating known attacks on block cipher systems.

Slowing the rate at which packets are sent through WAN 170 by endpoint system A 150 makes it more difficult for an adversary to recognize those packets as related to one another, breaking the direct relationship between the rate at which data is received from the device side of endpoint system A 150 and the rate at which data leaves endpoint system A 150 for transmission through WAN 170.

Bit Insertion

Expanding on the commingling of multiple independent data streams, each endpoint system can randomly insert bits from internal channels, low QoS data, and a shared source of random bits (e.g., shared random data 606) during bit spreading in sub-packet creation. By inserting additional data into sub-packets formed in steps 310-324, endpoint system A 150 further distorts the relationship between the amount and rate of data received at the device side and the amount and rate of data transmitted through WAN 170 as a result.

The rate of insertion is the exposed control for this action. When the insertion rate is zero, no bits are inserted other than as described herein, e.g., to pad the sub-packet to the appropriate size. However, when the insertion rate is greater than zero, randomized bits are inserted at approximately the insertion rate from the queue of available sources.

Inserting at least one bit per cipher block, which can be the data payload of one sub-packet, causes half the encrypted bits to change, frustrating any exploitation of data between endpoint systems A 150 and B 180. Insertion of internal or low QoS sources does not increase overall data size since such data would have to be transmitted by other means otherwise. However; random insertion does increase overall data size, but strengthens mightily against block cipher attacks. Inserting random bits comes at the cost of extra communication. A low rate of 1⁄128 (one bit per 16-byte cipher block) causes a 0.78125% increase in data while a high rate of 1⁄8 (one bit per byte) represents a 12.5% increase.

A channel's rate of bit insertion can set arbitrarily high—extreme rates of 7⁄8 and 127⁄128 request just one non-random data bit per byte or encryption block, respectively. Within the endpoint system, the use of extremely high insertion rates is a convenient way to send blocks of internal channel and perverse QoS data. Endpoint system A 150 can inform endpoint system B 180 by sending a small "ignore me" control packet that includes bit insertion rate=length(DesiredData)/(length(DesiredData)+length(ControlPacket)) so that the desired amount of data will be automatically inserted while sending the control packet.

Background Data

One of the benefits of spread-spectrum in radio transmissions is the presence of cosmic radiation in the background that helps disguise the signal. To emulate this advantage, endpoint systems A 150 and B 180 can send dummy data packets between one another. The dummy packets, sometimes referred to herein as noise packets, carry no information intended to be communicated between the endpoint systems but instead are sent as decoys to increase the difficulty of adversaries detecting data traffic between the endpoints.

In an extreme example, endpoint systems A 150 and B 180 send random data at a chosen rate, likely the link rate, with a 100% duty cycle. This would be an omnipresent stream of noise much like cosmic background radiation. Generated background data is perfectly effective at hiding presence or absence of substantive packet traffic as one simply substitutes traffic for random data as needed. In situations in which extreme security is needed, such as in military and intelligence community contexts, adding noise packets to use the full bandwidth of network links, i.e., bandwidth saturation, may be warranted.

Bandwidth saturation has disadvantages. If bandwidth saturation is used only when sending data between endpoint systems, this river of data is highly unusual and thus notable. Adversaries will detect the activity and investigate. In public networks, e-commerce vendors will notice and respond to such highly unusual activity as an existential threat; such heavy traffic violates critical presumptions of network provisioning by mobile carriers and network operators. Of course, noise packets can be generated and sent such that the aggregate data traffic through an endpoint system is less than full bandwidth saturation.

In this illustrative embodiment, endpoint system A 150 generates random background data into which substantive data traffic is seamlessly merged. Unlike a hypothetical universal background data generator, noise data generation is nuanced to provide enough "cover" for transmissions—for robust defense against traffic analysis—but in minimal ways that frustrate detection of background data generation.

Rate Limits

The rate at which endpoint system A 150 generates random background data has two configurable limits, the minimum rate and the maximum rate. These rates can be expressed in bits per second or as link rate proportion. The extreme settings here are min=max=0% for no dynamic generation, and min=max=100% for bandwidth saturation. The default values of min=0, max=100% lets endpoint system A 150 decide for itself according to its configuration and logic.

Rate Selection

Data arriving at the device-side of endpoint system A 150 defines the amount of data endpoint system A 150 must send. The quality of service settings for that data, set directly or implied by address rules, defines the urgency for sending this data. The rate minimization process by endpoint system A 150 is in many ways like power utility peak shedding and load balancing logic. The transmission schedule codifies "must send this many bytes over the next units of time." This dynamic schedule represents just how busy the network-side links need to be and does so in advance whenever perverse QoS is enabled. The presence of perverse QoS has the effect of moving such traffic away from the mandatory peaks of non-perverse traffic.

Endpoint system A 150 stores a history of data arriving from devices 111-119 for statistical analysis. Such statistical analysis allows endpoint system A 150 to anticipate data transmission needs over a hierarchical range of times, e.g., during the next second, 2 seconds, 4 seconds, and so on. The integral of this demand over each timescale defines the least work the device must do and also, sets the basis for determining how much noise data to generate.

In determining how much noise data to generate, endpoint system A 150 uses the following parameters: rate, scale, and variance. The rate determines how slowly or quickly the rate of noise generation is permitted to change as a function of time. The scale is a multiplier of how much more data should be generated than the schedule's peak. For example, if statistical analysis by endpoint system A 150 of historical data requirements and analysis of data currently received from devices 111-119 indicates that as much as 128 kb of substantive data must be transmitted in the next second, a scale of 50% indicates that 64 kb of noise data should be generated and intermingled with the substantive data such that endpoint system A 150 sends a total of 292 kb of data over the next second. The variance specifies randomization characteristics of the noise to be added at the rate and scale specified. Endpoint system A 150 also calculates an optimized generation schedule sufficient to clear the "must-send" peaks at all scales, honor the parameters (particularly the rate of change), and yet be as low as possible. The optimization generation schedule is asymptotically fit to the min and max limits, and result is the dynamic rate of background data generation.

The variance affects the randomization of noise data as follows. Adding noise data considering the rate alone results in smoothly varying amounts of noise data under smoothly varying loads. As a result, an adversary might detect this structure as an indication of endpoint processing, something to which the adversary should turn her attention. To thwart this potential detectability, the further step of jittering the rates (in accordance with the variance) is done randomly. As an example, we might send a little less than needed for half a second, and compensate with as much more in the other half-second. This does not change the overall rate but makes it a little noisy. In practice, endpoint system A 150 performs this jittering at many rates, ranging from hours to nanoseconds. Endpoint system A 150 implements a selectable range of time-scales an jitter factors, whose aggregate impact is to modify the smoothly varying background rate into what appears a random one. In this illustrative embodiment, endpoint system A 150 makes smaller changes to rates in finer time scales (high frequencies). In particular, endpoint system A 150 scales the size of the noise data by 1/frequency, which approximates a fractal noise pattern nearly universal in nature and typical systems. This particular mechanism is but one of many that can be used.

Rate Shaping

Natural network activity does not follow smooth changes in transmission data rates. Accordingly, endpoint system A 150 randomly perturbs the dynamic rate of background data generation to provide peaks, dips, and gaps in data transmission rates to give the impression of natural network activity—but without decreasing the integrated transmission rate. The presence of a large amount of latency-tolerant, perverse-QoS traffic allows the overall rate to be a small, defining an intermittent meandering stream as opposed to an immense river. In this way, endpoint system A 150 is an effective barrier to traffic analysis while remaining subtle and unnoticed amidst other network traffic.

Rate History

Historical records of device side data rates and background data generation rates are kept by endpoint systems A 150 and B 180, e.g., in endpoint security data 522. Such records allow endpoint systems to adjust the near term minimizing logic of dynamic rate setting based on longer term behavior. The presumption of such adjustments is that past performance is a predictor of future performance, which famously is not always true. Yet, in cases where endpoint protected devices, e.g., devices 111-119 and 191-198, have consistent, cyclic, or episodic behavior, using the lessons of history can be valuable.

Consider an endpoint-protected point of sale (PoS) terminal in a Target store communicating with a central server. The PoS terminal will have bursty traffic as each customer's transaction is consummated, short gaps in communication between customers, long gaps when a register is unattended, and very long gaps when the store is closed overnight. The rate history parameter settings are used to control which of such gaps is fully or partially spanned by background data generation. This case also illustrates the value of negative QoS—allowing a slight delay in the peak will have a great effect in lowering the historically driven level of data generation to a fair approximation of cosmic background radiation.

Transmission Control—Dynamic Spreading

Up to this point, the number of channels across which data is spread by the endpoint system, e.g., determined in step 308, has been described as a free variable, S. The choice of S is arbitrary and has no effect on transmission and reconstruction. Larger values cause more overhead, but, they also greatly increase the necessary effort of an adversary and any overhead increases likewise increase internal channel bandwidth.

One implication of narrower vs. wider spreading is the size of resulting output packets. For example, 64 kb packets spread 32 ways results in 2 kb output packets, while the same input size spread 1024 ways results in 64 byte packets. Because the output packet size can have an impact on transmission efficiency, endpoint system A 150 sets the desired size of output packets in an alternative embodiment and uses the desired packet size value to dynamically set the spreading factor of each input packet, using:

$$\text{spread} = \text{Floor}((\text{length}(\text{packet}) + \textit{desiredSize} - 1) / \textit{desiredSize}) \quad (6)$$

Setting desiredSize in equation (6) to 8 kb causes 64 kb packets to be spread by a factor, S, of 8. However, a 4 kb input packet with an 8 kb desiredSize setting will still result in a 4 kb output packet. It should be appreciated that this size is independent of actual transmission frame sizes and considerations of normal and jumbo frames.

In above description regarding Multiple Streams, it was mentioned that endpoint system A 150 can aggregate packets before sending and separate packets after receipt. When a desired spread factor, S, results in packets smaller than desiredSize, endpoint system A 150 can aggregate packets in that manner. In this situation, endpoint system A 150 determines a logical spread factor—e.g., four (4) times the natural spread factor defined by the desired output packet size and merges groups of four (4) logical packets to make physical packets of the desired size.

A third output shaping choice is for exact packet sizes. In this case, endpoint system A 150 distributes the bits to packets of the desired size and packs each with random bits to fill out the packets.

Transmission Ordering

The simplified, synchronous description of endpoint processing presented previously, has packets received, spread or unspread, and resulting packets implicitly transmitted in order of arrival. Endpoint system A 150, however, does this processing asynchronously—packets are received, spread or unspread, encrypted or decrypted, and transmitted concurrently. This means that multiple packets can be ready at the time of a transmission.

In "*Riffle, An Efficient Communication System With Strong Anonymity*" [Proceedings on Privacy Enhancing Technologies 2016; 2016(2):1-20], authors Kwon, Lazar, Devadas, and Ford analyze the privacy advantages of gathering packets over an extended time interval and then releasing the collected packets in a shuffled order. (Thus the name 'riffle.') While their research is in the context of strong anonymity networks for microblogging, file sharing, and communication, we have found the concept of transmission order randomization at nodes in a communication fabric to be useful in endpoint processing.

In this illustrative embodiment, endpoint systems A 150 and B 180 shuffle the order of packets gathered and pending transmission as allowed by quality of service settings. Endpoint systems A 150 and B 180 can also gather packets over a longer interval to shuffle an expanded collection for the benefits reported in Kwon et al. but at the cost of added latency. In this embodiment, shuffling among pending packets does not increase latency and is therefore the default behavior of endpoint systems A 150 and B 180. As in Kwon, the notion of gathering pending packets over an extended interval for enhanced reduction of inbound and outbound channel affinity comes at the cost of latency. The extraDelayTime parameter, which specifies an amount of time an endpoint system waits to gather additional packets to shuffle, defaults to zero for this reason. The natural delay time allowed by quality of service can also be scaled as desired.

Packet Filtering

Endpoint systems A 150 and B 180 can encounter both plain and special packets. As used herein, "special" packets are packets addressed to the endpoint system directly (in the visible mode) or packets passing through for an address or address range recognized as being behind an endpoint system (in the invisible mode). Generally, any packet processed by endpoint system A 150 in the manner described above is a special packet. A plain packet is any packet which is not special. Depending on the placement of endpoint systems within a network topology, the filtering of plain packets can be desirable.

Pass Through

The default configuration of endpoint systems A 150 and B 180 is to pass plain packets through the endpoint system unchanged. In passing plain packets through, endpoint systems A 150 and B 180 can act as ordinary, conventional network nodes in addition to providing secure communications in the manner described herein. It is this mode that allows endpoint systems to be invisibly added to an existing general network.

Blocking

In a most-secure and most-private configuration, an endpoint system can be configured to block plain packets. For example, if endpoint systems A 150 and B 180 are so configured and know only of each other and no other endpoint systems and devices 111-119 and 191-198 have no connection to WAN 170 other than through endpoint systems A 150 and B 180, total communication privacy exists between endpoint systems A 150 and B 180. In particular, no other network device could reach, or be reached from, them—as if they are hardwired on their own network. This same assurance is conferred to an entire LAN by interposing an endpoint system between the LAN's edge and its WAN link. In mesh configurations, this creates a "virtual air-gap wide area network."

Forwarding

In some configurations, imposing the secure air-gap mentality on a computing environment is too strict as communication with destinations other than an endpoint system is necessary. While external network switches can be used to route plain packets away from endpoint systems, it can also be helpful for the endpoint systems to forward plain packets as a service—to a firewall, to a security device, or elsewhere.

Key Distribution and System Configuration

In this illustrative embodiment, endpoint systems A 150 and B 180 are managed devices, with various compatible mechanisms to allow encryption keys and operating modes to be configured as desired. However, such out of band management is not the only choice given internal channels between endpoint systems. Use of in band control is a choice as well.

An important use of in-band management is in secure Internet of Things (IoT) applications. Examples of highly sensitive IoT devices include an aircraft engine, an implanted medical device, and a sensor on the sea floor. In such highly sensitive applications, the logic of endpoint system A 150 described herein can be implemented directly within an IoT device. The ability to reliably control such devices is critical and, for this reason, endpoint systems A 150 and B 180 support in-band communication for key distribution, system configuration, and software updates.

Endpoint Pairing

Device pairing provides additional security and reliability in endpoint systems such as endpoint systems A 150 and B 180. In this illustrative embodiment, pairing includes tight logical bonding of two endpoint systems from first contact through growth over time and shared experience. Such pairing provides a number of advantages, including improved ability to detect changes at a distant endpoint system, such as a replaced or modified endpoint system, adversarial introduction of an interstitial endpoint system, or the replay of past traffic between the paired devices. Another advantage is improved protection against an adversary with access to device passwords or device details.

Figure 6:
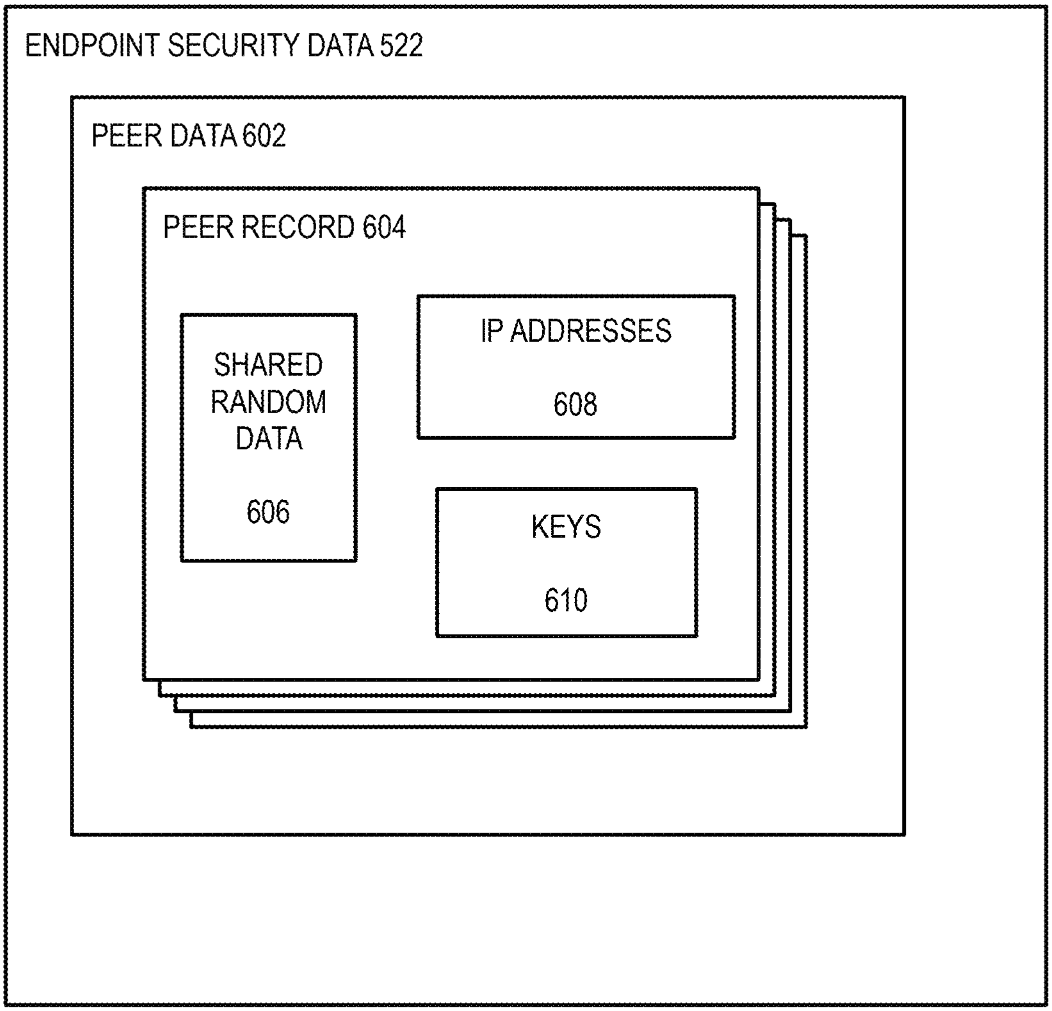
FIG. 6 is a block diagram illustrating endpoint security data of FIG. 5 in greater detail.

The pairing implementation uses data stored in an endpoint system for each of its peer endpoint systems—see, e.g., shared random data 606 (FIG. 6). Shared random data 606 is block of random bytes, generated mutually, encrypted, shared through an internal channel with extreme bit insertion rates, updated carefully, and known only by the pair of endpoint systems. During the packet processing described herein, endpoint system A 150 uses these bytes to perturb packet processing in various ways, though never to change the defined keys or validated encryption mechanisms. The arena of effect is between the inner and outer encryptions (e.g., in steps 310 and 412), where stream interdependence computations, bit spreading, bit insertion, and other steps are specialized based on the pair's private shared data.

During initial pairing, endpoint systems A 150 and B 180 cooperate to create identical copies of shared random data 606. In addition, endpoint systems A 150 and B 180 both modify shared random data 606 over time in identical ways such that shared random data 606 changes over time but remains identical in both of the paired endpoint systems. For example, each time endpoint systems A 150 and B 180 exchange data, e.g., in the manner described above with respect to FIGS. 2-4, both endpoint systems A 150 and B 180 can use the contents or other details of the data exchange to modify both copies of shared random data 606. Thus, the pairing of endpoint systems A 150 and B 180, as represented by shared random data 606, grows over time with experience shared by endpoint systems A 150 and B 180.

Use of shared random data 606 between outer (step 306) and inner (step 318) encryption is a subtle choice of placement. By doing pair-dependent processing here, endpoint systems A 150 and B 180 still have the transmission and key validation of the Galois Counter Mode when performing the inner decryption. If the outer decryption (step 414) fails after specialized packet processing (after inner decryption in step 408), then it can be assumed that the sending endpoint system is abnormal—a different endpoint system than expected with either a different outer key/nonce pair or with different shared random data 606. If retrying with older versions of shared random data 606 is successful, we know when we face a replay attack and can often bracket the time of its origin. By retrying the packet processing with the initial pre-paired configuration, successful outer decryption means the distant endpoint system, e.g., endpoint system B 180, has been replaced with a new one, or that a new one has been inserted between the pair—and that it has the right keys. As in packet filtering, endpoint system A 150 has a choice to make in this situation: reset to accept a new endpoint system or reject, refusing to recognize a new endpoint system.

Reset

In the reset case, endpoint system A 150 simply resets its shared random data 606 to the default and continues without note. This behavior is friendly to hardware changes in the field and is just as safe as is the privacy of the keys, for this is what endpoint system A 150 relies upon. Endpoint system A 150 can be configured to perform this reset silently or to record a log of this activity, and also to notify an external security system for awareness.

Reject

To reject a distant endpoint system based on loss of shared random data 606 is the security goal of pairing. In this mode, endpoint system A 150 immediately stops communicating with the other endpoint, e.g., endpoint system B 180. The rejection can be silent or logged as described with resetting shared random data 606, and is intended to report an alarm to an external security system.

A significant further reason for pairing of endpoint systems is the call for post-quantum cryptography by the National Institute of Standards and Technology (NIST) and other concerned entities. In security research circles, this quest has been framed as a strengthening of public key cryptography, symmetric key cryptography, and secure hash functions against unbounded computation. Since the basis of modern cryptography is the scarcity of adversarial computation, the quantum specter poses a looming existential crisis.

One might ask: "What is unchanged by boundless computation?" Our considered answer is, the arrow of time, that is the notion of past and future and the inaccessibility of the past. From this came the idea to use prior keys and traffic, in some form, as the encryption key. This approach is in the spirit of Cipher Block Chaining in DES, the use of Galois Counter Mode in AES, of Perfect Forward Privacy in TLS, and the paired action at a distance of Adaptive Delta Pulse Code Modulation (ADPCM) and Arithmetic Coding.

Each endpoint system pair knows the keys they have both used, the traffic they have both seen, and the pairing data they have communicated privately. This is the basis of the transformation perturbation data block built via secure hashing with SHA-256/512 and SHA3-256/512. Since pairing adjustments include differentiated bit insertion, since all adjustments are between two strong cipher systems, and with the adjustments constantly changing, there is no known plaintext attack on the inner encryption—the one whose output is exposed to the outside network. An attack on the entire endpoint system thus means a key space attack on the encryption at both ends (2×128/256 bits) and the very large pair state (≥1024 bits). Even if computable by quantum effort, it would be ineffective, because the pair state as represented by shared random data 606 changes during physical operation of endpoint systems A 150 and B 180.

Use of shared random data 606 in the manner described herein is quantum resistant in part because the arrow of time denies even an adversary with boundless computation the ability to go backward through time to recreate the relationship of endpoint systems, because the changing of shared random data 606 prevents sufficient work in a static key state to develop insight into the aggregate cryptosystem (both how shared random data 606 is used and how it changes over time), and further, because dynamic pairing data means (as would a one-time pad) that any success by an adversary would be fleeting, and betray nothing about communications prior or since, nor aid in future attacks. In effect, the armor against quantum cryptography is the entanglement of endpoint systems.

Packet Forwarding

As described above, endpoint systems such as endpoint systems A 150 and B 180 route sub-packets to other endpoint systems using phantom addresses, e.g., IP addresses 608 (FIG. 6). Security can be further enhanced by sending those output sub-packets to an endpoint system other than the intended destination, with the instruction to forward the sub-packet to the true destination or to further forward the packet randomly or deterministically. For example, sub-packets intended for endpoint system B 180 can be sent instead to endpoint system A 150 with instructions to forward the sub-packet to endpoint system B 180, either directly or through one or more other endpoint systems.

In this illustrative embodiment, this same sub-packet ultimately destined for endpoint system B 180 can be further forwarded by endpoint system B 180 to other endpoint systems. Such helps disguise the true destination of the sub-packet. Using a time-to-live attribute, the sub-packet is ultimately dropped by some subsequent forwarded destination.

This routing of sub-packets could create a Tor-like anonymity network, but in endpoint security logic 520. All that is needed is to allow communications between endpoint systems A 150 and B 180 to involve at least one other endpoint system. Even a single packet forwarded this way means that an adversary must get all traffic from either end of the link—traffic from every connection—to have any hope of information exploitation. This forwarding means total latency will likely be greater, increases the risk transmission failure, and increases overall data traffic. Yet, the benefit can be valuable for both privacy and security, and can be enabled and controlled as desired.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A non-transitory computer readable medium useful in association with a computer which includes one or more processors and a memory, the non-transitory computer readable medium including computer instructions which are configured to cause the computer, by execution of the computer instructions in the one or more processors from the memory, to enhance fortified private communications between a source device and a destination device by at least:

- receiving a data packet from the source device, wherein the data packet includes header address data that addresses the data packet to the destination device;
- encrypting the data packet to generate an encrypted packet;
- defining a maximum size and a minimum size of a sub packet;
- determine a number of channels that the encrypted packet will be transmitted by to an end device, wherein the number of channels is greater than one, and wherein the number of channels is determined by dividing the data packet into equal sized segments, wherein each segment has a size larger than the minimum size and less than the maximum size;
- assigning each bit of the encrypted packet to a channel from the number of channels to generate the sub-packet for each channel via a seeded pseudo-random number generator; and
- transmitting the sub-packet via each channel.

2. The non-transitory computer readable medium of claim 1 wherein a last bit of the sub-packet is finalized.

3. The non-transitory computer readable medium of claim 1 wherein the sub-packet is encrypted.

4. The non-transitory computer readable medium of claim 1 wherein the sub-packet is finalized with verification data.

5. The non-transitory computer readable medium of claim 1 wherein for each channel the sub-packet is transmitted.

6. The non-transitory computer readable medium of claim 3 wherein for each channel the sub-packet is received at the destination device.

7. The non-transitory computer readable medium of claim 4 wherein the sub-packet is decrypted at the destination device.

8. The non-transitory computer readable medium of claim 5 wherein the sub-packet is verified at the destination device.

9. The non-transitory computer readable medium of claim 5 wherein the sub-packets are reconstructed at the destination device to form an encrypted original message.

10. The non-transitory computer readable medium of claim 7 wherein the encrypted data packet is decrypted at the destination device.

11. The non-transitory computer readable medium of claim 1 wherein each channel is a phantom IP address generated using reverse proxy.

12. The non-transitory computer readable medium of claim 11 wherein there are a minimum of a thousand channels.

13. The non-transitory computer readable medium of claim 1 further comprising shuffling bits of the encrypted data packet prior to generating the sub-packets.

14. The non-transitory computer readable medium of claim 1 further comprising applying an invertible function to any given sub-packet.

15. The non-transitory computer readable medium of claim 1 further comprising inserting random bits prior to generation of each sub-packet.

16. The non-transitory computer readable medium of claim 1 further comprising sending random data filling the bandwidth between the source device and the end device.

* * * * *